United States Patent [19]

Gundlach et al.

[11] Patent Number: 5,032,766
[45] Date of Patent: Jul. 16, 1991

[54] SPECIAL EFFECTS GENERATOR

[76] Inventors: Glenn Gundlach, 1254 Vista Ct., Apt. 9, Glendale, Calif. 91205; Curt Lundgren, 3908A Prospect Ave., Culver City, Calif. 90232; William Irwin, 1636 N. Verdugo, Glendale, Calif. 91205

[21] Appl. No.: 478,282
[22] Filed: Feb. 9, 1990
[51] Int. Cl.⁵ .......................................... H05B 37/02
[52] U.S. Cl. .................................. 315/150; 315/155; 315/158; 315/287; 315/307; 315/362
[58] Field of Search .............. 315/149, 150, 155, 158, 315/159, 246, 287, 291, 307, 362

[56] References Cited
U.S. PATENT DOCUMENTS
4,064,414 12/1977 Bergeson et al. ............... 315/291 X Primary Examiner—Robert J. Pascal
Attorney, Agent, or Firm—John J. Posta, Jr.

[57] ABSTRACT

A device for use as an electronic generator for generating a highly realistic flickering light is disclosed which has adjustable brightness, flicker rate, and flicker level to accurately simulate a variety of lighting effects such as fire, reflections from natural sources, and light from man-made sources. The device uses a pseudorandom output generator to generate a variable level analog signal which may be adjusted in frequency, with additional controls being added to control the level of the signal of the signal variation and the overall signal level. The resulting signal is then used to drive lamps through relays, with multiple channels being used in the preferred embodiment.

18 Claims, 3 Drawing Sheets

SPECIAL EFFECTS GENERATOR

BACKGROUND OF THE INVENTION

Field of the Invention

The present invention relates generally to special effects lighting, and more particularly to an electronic generator for generating a highly realistic flickering light which has adjustable brightness, flicker rate, and flicker level to accurately simulate, a variety of lighting effects such as fire, reflections from natural sources, and light from man-made sources.

One of the goals in making motion pictures is to have the filmed sequences appear as realistic as possible. In the accomplishment of this goal, a wide variety of special effects are necessary, and the field of special effects has become both a highly specialized profession and an exceedingly complex field. One of the subspecialities of special effects is special lighting effects, in which the effects crew is called upon to produce a wide variety of lighting effects which must appear on film to actually be various types of desired lighting.

One type of lighting which must be frequently simulated is flickering light, such as that generated by fire and other naturally flickering light sources. Examples of such sources include light reflected from the surface of water and light flickering through trees which are moving in the wind. Other types of flickering light called for include simulating flickering light from man-made sources such as motion picture projection and television screens.

In the production of motion pictures, television programs, or live theater productions, such lighting must appear to accurately simulate the desired light source to make a scene appear realistic. During the course of such productions, the level of general lighting used is quite intense, and as such the general lighting would overcome light generated by the natural flickering light sources mentioned above. Therefore, the flickering light source used to simulate the desired light must be more intense than the general lighting used.

Applications aside from motion picture special effects lighting include ornamental lighting where a flickering firelight effect is desired. Low power capacity flicker effect generators can find potential use in homes, restaurants, malls, etc. for Christmas tree lighting, chandeliers, exterior lighting, etc.

As might be expected, the art teaches a number of simulated flickering light sources. Most of these references utilize a common element, which is the movement of a mechanical apparatus to randomly diffuse light from a light source. Examples of such devices are found in McCormick U.S. Pat. No. 1,514,552, in Best U.S. Pat. No. 1,775,885, in Nielson et al U.S. Pat. No. 3,526,984, and in Plambeck et al. U.S. Pat. No. 4,026,554.

The McCormick reference teaches an apparatus used in a novelty display in which a forest fire is simulated. The Best device illustrated an apparatus which simulates a solid fuel fire in an advertising sign. The Nielson et al. and the Plambeck et al. references both teach devices used to simulate burning logs in a fireplace. All of these mechanical devices are used to produce a low level flickering light, and would be unsuitable for use to produce the effect contemplated by the present invention.

Another approach taken to produce a flickering light effect is the use of a valve to modulate a gas fire. This technique is shown in Poling et al. U.S. Pat. No. 3,723,046. Such a device will produce a flickering fire, but the effect has the disadvantage that it is not sufficiently bright for use in the motion picture or television industry. In addition, the use of a live flame carries with it the hazards and dangers of fire, the use of which in a sound stage may better be avoided.

Rather than use such devices, the motion picture and television industry has largely relied on the use of manual, mechanical techniques to produce flicker lighting effects. Such techniques include waving objects in front of a lighting source, using mechanical objects in front of a lighting source, or using a manually operated reflector in conjunction with a lighting source. Such techniques have the disadvantages of being labor intensive, and, even worse, of not producing a light display which appears random in nature.

An electronic device has also been used, with the device using a noise generating diode or other electronic means of producing a random or pseudorandom sequence which may be used to drive a light in a flickering manner. Such devices have virtually no capability for adjustment, with the light output typically alternating between 30% and 100% of maximum output. No control over any of the characteristics of the light or the flicker is available, with the effect not appearing to duplicate as closely as desirable the flickering light source desired.

It is accordingly the primary objective of the present invention that it provide an apparatus for controlling a light and causing it to flicker in an extremely realistic fashion. The flicker must be random in appearance and must drive the light to a number of random light levels rather than the two levels used by known devices. In addition, an improved flicker controlling device must operate fully automatically, with its operation continuing with no other user intervention being required once it is set up.

In addition, it is an objective that the distinctiveness of the flicker effect be capable of precise control, so that the exact nature of the flicker may be controlled to a high degree. As such, the intensity of both the maximum amount of light generated and the degree of flicker should be subject to a highly precise level of control. The device should also retain a high degree of ease of adjustment, making the setup of different flicker effects easy and quick to accomplish.

It is a further objective of the present invention that the device be compact in size, and that it be capable of operation on common line voltage. It should desirably be inexpensive of construction to afford it an economic advantage in competing with currently used manual techniques. It should also be durable and long lasting, to make a well rounded product. It is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, a flicker generator having a high degree of adjustment over the characteristics of the flicker effect produced is described. Unlike past mechanical techniques of generating flicker, the flicker generator of the present invention operates electronically to control the operation of one or more lights, which lights are of standard design.

The heart of the flicker generator of the present invention is a random output generator which generates a rapidly varying output which may be any one of a number levels, with the output being random in nature. As will be realized by those skilled in the art, it is not necessary to have a truly random output generator, rather, the present invention uses a pseudorandom output generator which does not repeat frequently. The pseudorandom output generator has at least one control, which may be used to vary the frequency at which the random level is generated.

In the preferred embodiment, the pseudorandom output generator is a pseudorandom sequence generator element driven by a variable frequency generator, with the random sequence generator element driving a digital-to-analog (D-A) converter. The variable frequency oscillator has a frequency control, which frequency control is used to control the flicker frequency. The random sequence element is a multi-stage shift register having a number of taps at random shift stages.

Sufficient shift stages are used to keep the sequence from repeating more than occasionally. The digital-to-analog converter is used to convert outputs from the taps of the random sequence generator element into a single analog signal which has a number of levels equal to the number of taps plus one. As a result, the pseudorandom output generator produces a random analog output level signal having variable frequency.

The random output level signal is then selectively attenuated, to produce a flicker level control. The flicker level control is preferably performed on the random analog output level signal, since it is easier to attenuate than the digital output of the random sequence generator element. In addition, a full level of analog control may be achieved over the random analog output level signal.

In the preferred embodiment, the attenuated random analog output level signal is then bandpass filtered to produce a filtered output level signal. The low frequency rolloff serves to integrate the random analog output level signal, while the high frequency rolloff serves to limit the change in signal level which may occur between consecutive half cycles. The result of high frequency rolloff is to reduce unnecessary stress in the filaments of lights which are driven by the system.

The filtered output level signal is thus frequency and level controlled by the control system. In the preferred embodiment, a dimmer control is also used to produce a dimmer controlled output signal. The dimmer controlled output signal is preferably obtained by summing the filtered output signal with a variable DC offset. It will thus be appreciated that the dimmer controlled output signal has variable frequency and intensity flicker, with control over the overall brightness of the dimmer controlled output signal.

The dimmer controlled output signal may be used as a trigger signal to operate lights directly. However, in the preferred embodiment, an additional operation is performed on the filtered output level signal before it is so used. The dimmer controlled output signal linearly represents the analog light output desired. This signal may be compared against a linear ramp at twice the line frequency to phase trigger a solid state relay (SSR). However, in the preferred embodiment a cosine ramp is used instead of a linear ramp. The effect of a cosine ramp into one input of the comparator is to create a voltage-to-power converter. The phase angle of the output trigger produces a linearly increasing level of power to the incandescent lamp for a linear increase in the control output, which is called the flicker generator output signal.

The flicker generator output signal is supplied to one or more relays, which are used to operate one or more lights in a manner corresponding to the flicker generator output signal. In the preferred embodiment, the relays are phase-controlled solid state relays (SSR's), which are used to control the output load of the lights, which are incandescent lamps. Various colored lamps or a combination of different colored lamps may be used to achieve a desired effect.

In the preferred embodiment, the flicker generator of the present invention has four independent channels used to drive four banks of lamps. The use of more than one independent channel allows for a further randomizing effect in the total light output. For example, a large fire may be accurately simulated using the four channels.

A number of alternate embodiments are specifically contemplated by the present invention. A number of these involve the digital-to-analog converter. Different numbers of taps from the shift register may be used to produce more or fewer levels in the analog signal. In addition, the weight of each tap may be varied if desired. Instead of the random sequence generator element used in the preferred embodiment, a microprocessor or an Application Specific Integrated Circuit (ASIC) could be used. Other alternate embodiments would include digital sampling of a naturally flickering event stored in ROM, an analog white noise source with a variable bandpass filter (digital or analog) is also contemplated, as are flicker generators with non-variable rate, intensity, and light level.

In the main alternate embodiment, a video camera is focused on a fire or similar activity. Cursors are drawn to specific locations in the picture, and the video signal within that cursor is converted to a voltage level indicative of the intensity of the video signal within the cursor. The voltage level is then used much as the random analog output level signal is used in the preferred embodiment. The light corresponding to the cursor will thus be controlled as a function of the level of light contained within the cursor.

It may therefore be seen that the present invention teaches an apparatus for controlling one or more lights and causing them to flicker in an extremely realistic fashion. The flicker is random in appearance, and drives the light to a number of random light levels rather than the two levels used by previously known devices. In addition, the improved flicker controlling device of the present invention operates fully automatically, with its operation continuing with no user intervention being required once it is set up.

In addition, the distinctiveness of the flicker effect of the flicker generator of the present invention is capable of precise control, so that the exact nature of the flicker may be controlled to a high degree. As such, the intensity of both the maximum amount of light generated and the degree of flicker are subject to a highly precise level of control. The device also retains a high degree of ease of adjustment, making the setup of different flicker effects easy and quick to accomplish.

The flicker generator of the present invention is also compact in size, and capable of operation on common line voltage. It is also inexpensive of construction, thereby affording it an economic advantage in competing with currently used manual techniques. Additionally, it is durable and long lasting. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
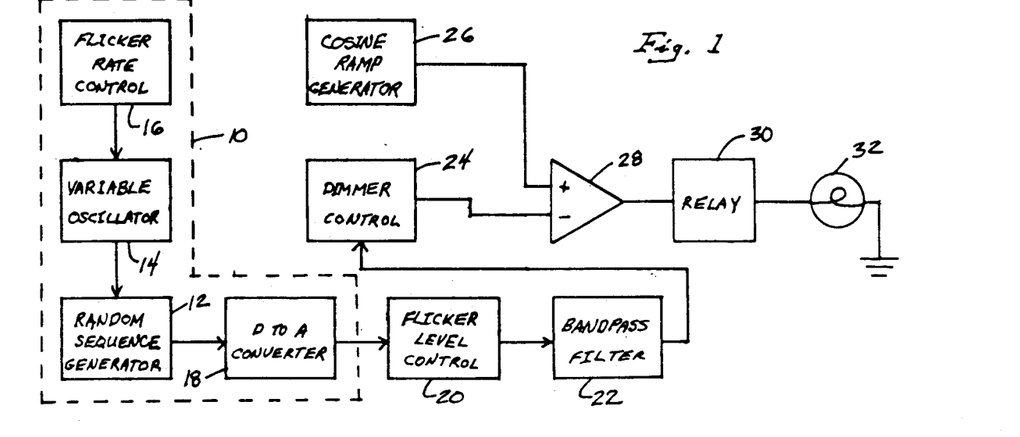
FIG. 1 is a schematic flow diagram illustrating the operation of the preferred embodiment of the flicker generator which is the subject of the present invention.

The preferred embodiment of a flicker generator having a high degree of adjustment over the characteristics of the flicker effect is illustrated in FIG. 1. The flicker generator of the present invention operates electronically to control the operation of one or more lights. In FIG. 1 a single channel flicker generator is illustrated, although in the preferred embodiment multiple identical channels are used to control multiple lights or multiple banks of lights, with the lights being incandescent lamps of standard design.

The flicker generator of the present invention relies on the principle of random number generation, generating a varying output which may be any one of a number of levels. Generally, the greater number of levels used, the more realistic will be the result. However, in practice, it has been found that four or more levels will produce a satisfactory result. The flicker generator described in the preferred embodiment uses 8 levels, although either more or fewer could be utilized.

The output level must be varied randomly to give a proper flicker effect, and the mechanism used to generate the multiple output levels must therefore have an adjustable frequency. In order to produce a realistic effect, the flicker must not be seen as a recurring pattern; accordingly, the flicker generator must operate either on a random basis or a pseudorandom basis in generating the multiple output levels. By pseudorandom, it is meant that the output level will be varied in a repeating pattern, but one complete cycle takes so long that it is virtually not susceptible of notice by the human eye.

To generate the randomly varying output of the flicker generator of the present invention, a pseudorandom output generator (10) capable of generating any one of n levels is utilized, where n is not less than four. The pseudorandom output generator (10) has a rate control which may be utilized the frequency at which the random output level is generated. It will be recognized by those skilled in the art that the pseudorandom output generator (10) could be manufactured using any of a number of different types of circuits.

In the preferred embodiment, the heart of the pseudorandom output generator (10) is a pseudorandom sequence generator (element 12). The pseudorandom sequence generator (12) has as an input a variable clock signal from a variable oscillator (element 14), with the rate at which the output from the pseudorandom sequence generator (12) varies being directly proportional to the variable clock signal. Variable rate oscillators are well known in the art, and typically use a potentiometer to adjust the rate of oscillation. The output rate of the variable oscillator (14) may be adjusted by adjusting a flicker rate control (16).

The output of the pseudorandom sequence generator (12) is typically a digital signal having n bits. The output of the pseudorandom sequence generator (12) is supplied to a digital-to-analog converter (element 18). The digital-to-analog converter (18) converts the n bit digital signal to an analog signal which has n+1 discrete levels. This assumes that the digital-to-analog converter (18) gives unequal weight to each of the n bits, which, in the preferred embodiment, it does (as will become apparent below in conjunction with the discussion of FIG. 4).

Thus, it will be perceived that the output of the digital-to-analog converter (18) is a random analog output level signal having n+1 levels. The frequency with which the output of the digital-to-analog converter (18) will change between levels is controlled by the adjustment of the flicker rate control (16). Thus, the output from the digital-to-analog converter (18) is the output of the pseudorandom output generator (10).

The random analog output level signal from the digital-to-analog converter (18) is supplied as the input to a flicker level control (20). The flicker level control (20) performs a selected variable degree of attenuation on the random analog output level signal, since it is easier to attenuate that analog signal than it would be to attenuate the digital output of the random sequence generator element. In addition, a full level of analog control may thereby be achieved over the random analog output level signal.

Note that although the flicker level control (20) contemplated by the preferred embodiment will act to multiply the random analog output level signal by a factor of less than or equal to one, an active element capable of amplifying the random analog output level by a factor of either less than, equal to, or greater than one could also be used. The output of the flicker level control (20) is thus an attenuated random analog level signal.

Figure 2:
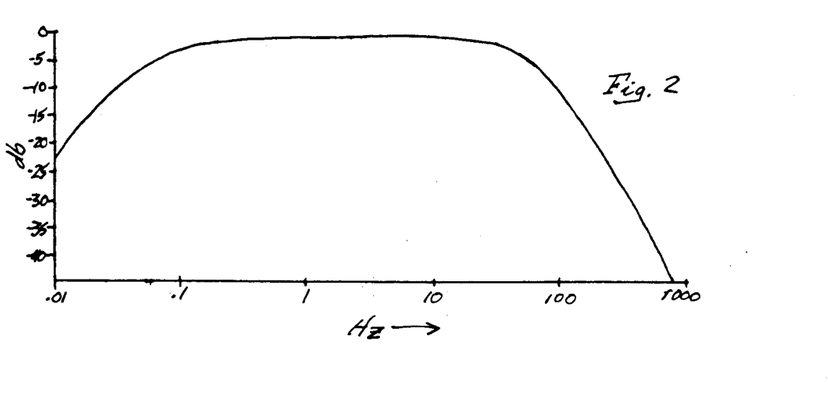
FIG. 2 is a logarithmic plot of the characteristics of the bandpass filter used as the bandpass filter of FIG. 1.

The attenuated random analog output level signal from the flicker level control (20) is supplied as the input to a bandpass filter (element 22). The bandpass filter (22) is in the preferred embodiment a passive bandpass network used to shape the attenuated random analog output level signal, and has the response illustrated in the plot of FIG. 2. The low frequency rolloff is between 0.01 and 1 Hz, and it serves to integrate the random analog output level signal. The high frequency rolloff is between 50 and 200 Hz, and it serves to limit the change in signal level which may occur between consecutive half cycles.

The high frequency rolloff has the result of reducing unnecessary stress in the filaments of lamps which will be driven by the system. It is apparent to those skilled in the art that normal human vision cannot perceive flicker at frequencies higher than 50 Hz. Therefore operating lamps with the flicker generator of the present invention at frequencies higher than may be perceived will only have the effect of severely reducing the operating life of lamps operated by the system. Thus the output from the bandpass filter (22) is a filtered output level signal which is both frequency and level controlled.

In the preferred embodiment, the filtered output level signal is then supplied as the input to a dimmer control (element 24). The dimmer control (24) typically operates by summing the filtered output level signal with a variable DC offset. The output of the dimmer control (24) is thus a dimmer controlled output signal, which has the frequency and intensity of the flicker controlled, and with a variable offset contained therein to control the overall brightness of the dimmer controlled output signal.

It should be noted at this point that the dimmer controlled output signal may be used as a trigger signal to operate one or a bank of lights. If it is so used, a relay or other power control device would be inserted between the dimmer control (24) and the lights to control the lights. However, in the preferred embodiment, yet another embellishment is to be added to further enhance the operation of the system.

Figure 3A:
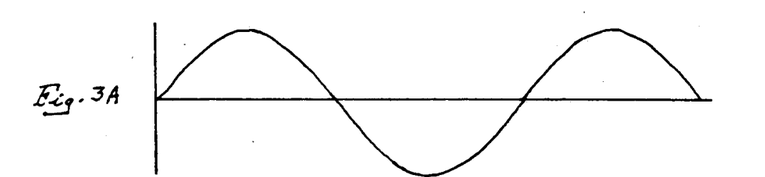
FIG. 3A is a plot of the AC supply signal versus time.
Figure 3B:
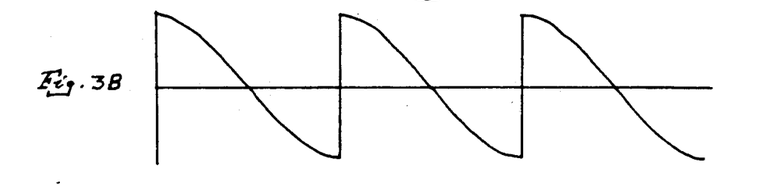
FIG. 3B is a plot of the cosine ramp waveform corresponding to the plot of FIG. 3A over time, the cosine ramp waveform being supplied by the cosine ramp generator in FIG. 1.

A cosine ramp generator (element 26) is used to generate a cosine ramp waveform, which is shown in FIG. 3B for comparison with an AC line reference shown in FIG. 3A. The cosine ramp waveform runs at twice the frequency of the AC line. Accordingly, a complete cosine ramp will be generated for each half cycle of the AC line.

Referring again to FIG. 1, a comparator (element 28) is used to compare the dimmer controlled output signal with the cosine ramp waveform. The output of the comparator is called the flicker generator output signal. The cosine ramp waveform has the effect of predistorting the output of the comparator (28), linearizing the amount of light which will be output from lights driven by the flicker generator output signal. This predistortion complements the non-linear light output versus phase angle control characteristics of incandescent lamps. Completing the apparatus of the flicker generator is a relay (element 30), which has as its driving input the flicker generator output signal from the comparator (28). One or more lamps are operated by the relay (30), as shown schematically by a lamp (element 32).

It will also be appreciated by those skilled in the art that the flicker generator output signal may be supplied to more than one relay (30), with multiple relays being used to drive banks of the lamps (32). In the preferred embodiment, the relay (30) is a phase-controlled solid state relay (SSR) used to control the output load of the lamp (32). Various color lamps (32) or a combination of different colored lamps (32) may of course be used to achieve a desired effect.

Figure 4:
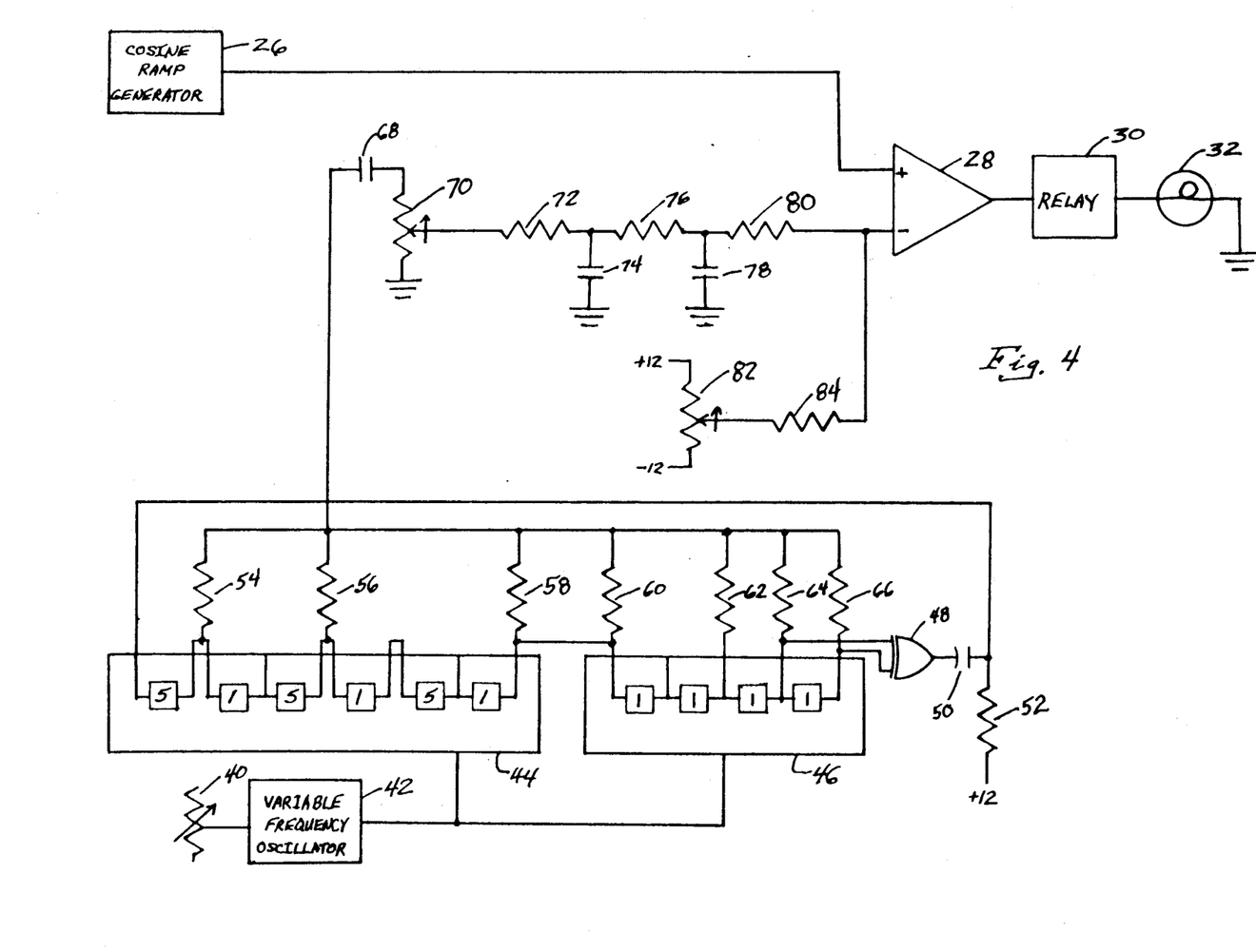
FIG. 4 is a schematic illustration of the preferred embodiment corresponding to FIG. 1 illustrating the random sequence generator element, the digital to analog converter, the bandpass filter, and the dimmer control.

Referring next to the more detailed schematic of FIG. 4, a potentiometer (element 40) is used to control the frequency of a variable frequency oscillator (element 42). The potentiometer (40) corresponds to the flicker rate control (element 16, FIG. 1), and the variable frequency oscillator (42) corresponds to the variable oscillator (element 14, FIG. 1). The output of the variable frequency oscillator (42) may range up to approximately 50 Hz (but will in operation generally be set at a lower frequency).

The pseudorandom sequence generator (element 12, FIG. 1) is made up in the preferred embodiment of two interconnected shift registers. An 18-stage shift register (44) and a 4-stage shift register (46) are used to produce a shift register having a total of 22 stages. This ensures that a pseudorandom sequence will be sufficiently long, with a repeat in just less than 24 hours at the high clock rate of 50 Hz. The output of the 18-stage shift register (44) is connected to the input of the 4-stage shift register (46). In the preferred embodiment, the 18-stage register (44) and the 4-stage register (46) are D-type shift registers.

Taps at the 21st and 22nd stages of the shift register (the 3rd and 4th stages of the 4-stage shift register 46) are supplied as inputs to an Exclusive OR gate (48). A capacitor (50) is connected between the output of the Exclusive OR gate (48) and the input to the first stage of the shift register (the input to the first gate of the 18-stage shift register 44). A resistor (52) is connected between the +12V power supply and the input to the first stage of the shift register (the input to the first gate of the 18-stage shift register 44). Feedback is thus provided through the Exclusive OR gate (48) to the input stage of the shift register. The capacitor (50) and the resistor (52) are used to ensure proper start up operation of the sequence generator upon power up.

Taps are made in the shift register at the ends of the 5th stage (the 5th stage in the 18-stage shift register 44), the 11th stage (the 11th stage in the 18-stage shift register 44), the 18th stage (the 18th stage in the 18-stage shift register 44), the 20th stage (the 2nd stage in the 4-stage shift register 46), the 21st stage (the 3rd stage in the 4-stage shift register 46), the 22nd stage (the 4th stage in the 4-stage shift register 46). Note that two taps are made at the 18th stage (the 18th stage in the 18 stage shift register 44). These taps represent the outputs of the pseudorandom sequence generator (element 12, FIG. 1). The random sequence generator (element 12) thus has a number of taps at random shift stages. Sufficient shift stages must be used to keep the sequence from repeating more than occasionally.

A resistor is attached to each of the taps, with all of the resistors being tied together at their other ends. A resistor (54) is attached at one side to the tap at the end of the 5th stage (the 5th stage in the 18-stage shift register 44). A resistor (56) is attached on one side to the tap at the end of the 11th stage (the 11th stage in the 18-stage shift register 44). A resistor (58) is attached on one side to the tap at the end of the 18th stage (the 18th stage in the 18-stage shift register 44). A resistor (60) is also attached on one side to the tap at the end of the 18th stage (the 18th stage of the 18-stage shift register 44).

A resistor (62) is attached on one side to the tap at the end of the 20th stage (the 2nd stage of the 4-stage shift register 46). A resistor (64) is attached on one side to the tap at the end of the 21st stage (the 3rd stage of the 4-stage shift register 46). A resistor (66) is attached on one side to the tap at the end of the 22nd stage (the 4th stage of the 4-stage shift register 46).

These resistors (54, 56, 58, 60, 62, 64, and 66) together form the digital-to-analog converter (element 18, FIG. 1). The other sides of the resistors (54, 56, 58, 60, 62, 64, and 66) are tied together as the output of the digital-to-analog converter (18). The digital-to-analog converter (18) thus converts outputs from the taps of the random sequence generator (element 12) into a single analog signal which has a number of levels equal to the number of taps plus one. This digital to analog converter (18) is substantially different from a standard R-2R approach, since in the preferred embodiment the value of all the resistors (54, 56, 58, 60, 62, 64, and 66) is equal.

The two resistors (58 and 60) at the end of the 18th stage (the 18th stage of the 18-stage shift register 44) give that tap twice the value of the others. This will result in the simulation of an occasional bright tongue of fire in a flame. Thus, the outputs of the resistors (54, 56, 58, 60, 62, 64, and 66) alternately add to or subtract from the output voltage at the common node. It will be appreciated that eight output levels can be produced by the digital-to-analog converter (18).

The output at the common node of the resistors (54, 56, 58, 60, 62, 64, and 66) is the random analog output signal. It is supplied to one side of a capacitor (68), the other side is connected to one side of a potentiometer (70), the other side of which is grounded. The output of the potentiometer (70) is the center tap, and the potentiometer (70) is the flicker level control (20, FIG. 1). Thus, the potentiometer (70) will control the voltage between the maximum flicker level and the minimum flicker level.

The center tap of the potentiometer (70) is connected to one side of a resistor (72), the other side of which is connected to one side of a capacitor (74) and one side of a resistor (76). The other side of the capacitor (74) is grounded. The other side of the resistor (76) is connected to one side of a capacitor (78) and one side of a resistor (80). The other side of the capacitor (78) is grounded. The other side of the resistor (80) is connected to the negative input of the comparator (28). The resistors (72, 76, and 80) and the capacitors (74 and 78) together form the bandpass filter (22).

A potentiometer (82) has one side connected to the +12V power supply, and the other side connected to the −12V power supply. The center tap of the potentiometer (82) is connected to one side of a resistor (84), the other side of which is also connected to the negative input of the comparator (28). The potentiometer (82) and the resistor (84) together form the dimmer control (24). By adjusting the potentiometer (82), the overall level output from the resistor (80) to the negative input of the comparator (28) may in effect be summed with a DC offset.

The above description of the present invention describes the operation of one channel. In the preferred embodiment, the flicker generator of the present invention has four independent channels which may be used to drive four banks of lamps. The use of more than one independent channel allows for a further randomizing effect in the total light output. For example, a large fire may be accurately simulated using the four channels.

A number of alternate embodiments are specifically contemplated by the present invention. A number of these involve the digital-to-analog converter (18). Different numbers of taps from the shift register may be used to produce more or fewer levels in the analog signal. In addition, the weight of each tap may be varied if desired. Instead of the random sequence generator element used in the preferred embodiment, a microprocessor or an application specific integrated circuit (ASIC) could be used.

Figure 5:
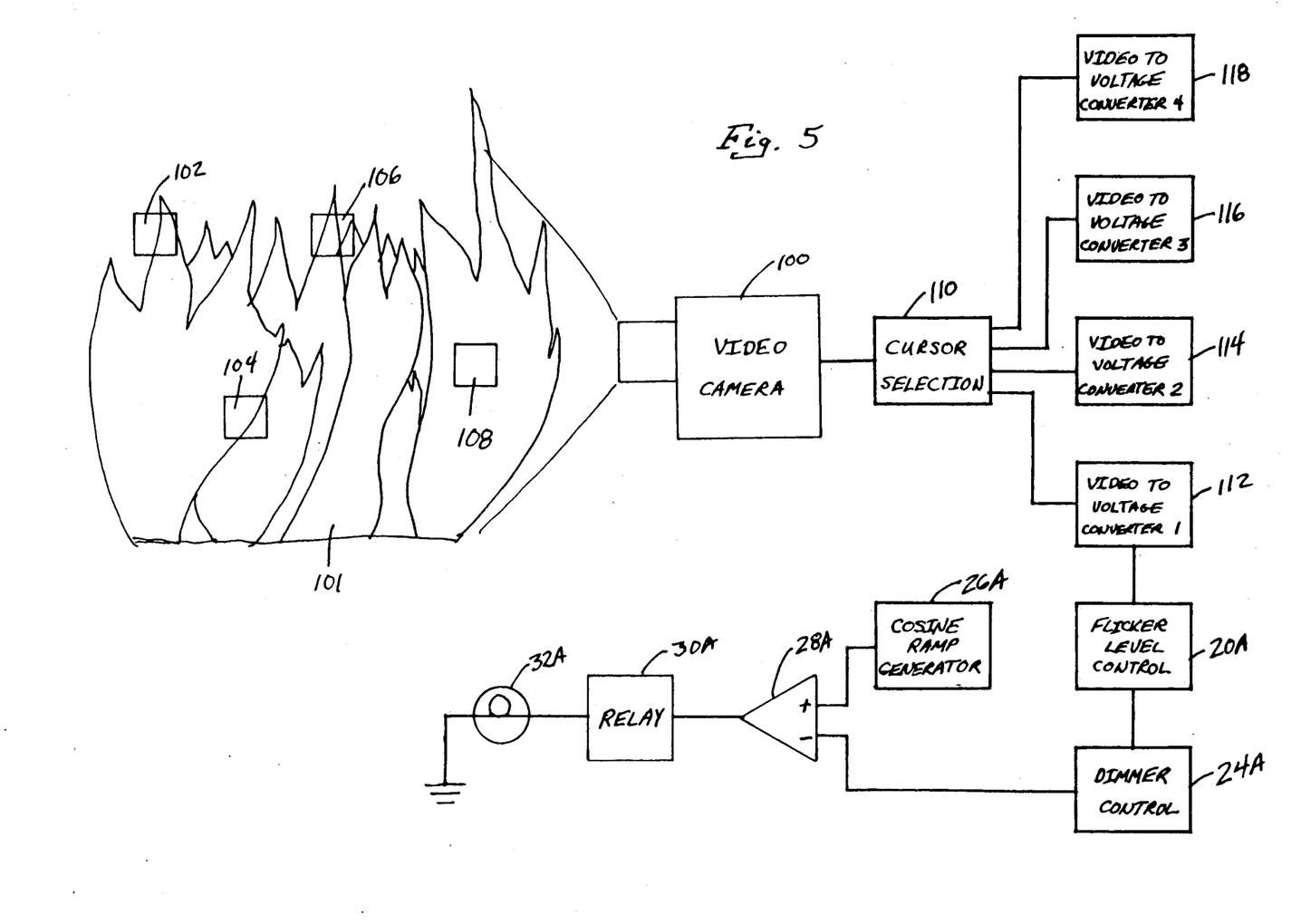
FIG. 5 is a schematic illustrating of the alternate embodiment using cursors placed within a picture from a video camera to generate the random analog output level signal.

In the main alternate embodiment illustrated in FIG. 5, an NTSC RS-170 or RS170A video camera (100) is focused on a fire (101) or similar light source to produce a video raster. Cursors (102, 104, 106, and 108) are drawn to specific locations in the video raster using a cursor selection microprocessor (110) connected to the video camera (100) through a standard connector. The four variable size cursors (102, 104, 106, and 108) may be placed anywhere within the raster.

The four cursors (102, 104, 106, and 108) are used to control the voltage output of four channels based on the Average Picture Level (APL) within each cursor. Four video to voltage converters (112, 114, 116, and 118) provide output voltages proportional to the Average Picture Level within the four cursors (102, 104, 106, and 108) respectively. The size of each cursor may be varied to include more or less of the scanned image. Regardless of the cursor size, the output accurately reflects the APL of the video within the cursor.

The voltage level from the video to voltage converter (1,112) is then used much as the random analog output level signal is used in the preferred embodiment. The output of the video to voltage converter (1,112) is supplied as the input to the flicker level control (20A), the output of which drives the dimmer control (24A). A bandpass filter may be optionally be used, but it is probably not needed due to the sampling rate. The output from the dimmer control (24A) is supplied together with the output from the cosine ramp generator (26A) to the comparator (28A). The output of the comparator (28A) drives the relay (30A), which operates the lamp (32A).

It may therefore be appreciated from the above detailed description of the preferred embodiment of the present invention that it teaches an apparatus for controlling one or more lights and causing them to flicker in an extremely realistic fashion. The flicker is quite random in appearance, driving the light or lights to a number of random light levels rather than the two levels used by previously known devices. In addition, operation of the improved flicker controlling device of the present invention is fully automatic, requiring no user intervention once it is set up.

In addition, the distinctiveness of the flicker effect of the flicker generator of the present invention is capable of precise control, so that the exact nature of the flicker may be controlled to a high degree. As such, the intensity of both the maximum amount of light generated and the degree and frequency of flicker are subject to a highly precise level of control. The device also retains a high degree of ease of adjustment, making the setup of different types of flicker effects easy and quick to accomplish.

The flicker generator of the present invention is also compact in size, and is capable of operation on common line voltage. It is also of relatively inexpensive construction, thereby affording it a strong economic advantage in competing with currently used manual techniques. It is additionally durable and long lasting. Finally, all of the aforesaid advantages and objectives are achieved without incurring any substantial relative disadvantage.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A device for generating a flickering signal to power a lamp in a flickering manner, comprising:

means for generating a first output signal which varies between a plurality of levels;

level control means for attenuating said first output signal by a selected proportion;

dimmer means for adding a variable amount of offset to said attenuated first output signal to produce a second output signal;

means for continuously driving a lamp with a variable voltage level proportional to said second output signal; and rate control means for varying the rate at which said variable power level varies levels.

2. A device as defined in claim 1, wherein said generating means comprises:

a sequence generator for generating a plurality of binary digital output bits; and a digital-to-analog converter for converting said plurality of binary digital output bits to said first output signal.

3. A device as defined in claim 2 wherein said sequence generator comprises:

a shift register having a plurality of stages, with said plurality of binary digital output bits being outputs of stages of said shift register, wherein said shift register has more stages than binary digital output bits.

4. A device as defined in claim 3, wherein said digital-to-analog converter comprises:

a plurality of resistors, each of said plurality of resistors having one side connected to receive one of said plurality of binary digital output bits, the other side of each of said plurality of resistors being tied together to provide said first output signal.

5. A device as defined in claim 3, additionally comprising: means for feeding back the output from the last of said stages of said shift register to the input of the first of said shift registers.

6. A device as defined in claim 3, wherein said rate control means varies the rate at which said variable voltage level varies levels by varying the rate at which said first output signal varies between said plurality of levels, said rate control means comprising:

a variable rate oscillator having as an output a clock signal which is supplied to said shift register; and means for varying the rate at which said variable rate oscillator oscillates.

7. A device as defined in claim 6, wherein said means for varying the rate at which said variable rate oscillator oscillates comprises: a potentiometer, the center tap of which is supplied as an input to said variable rate oscillator.

8. A device as defined in claim 6, wherein said variable rate oscillator has a maximum rate of approximately 50 Hz.

9. A device as defined in claim 1, wherein said level control means comprises:

a potentiometer, the input to which is said first output signal, said potentiometer having a center tap which is the output of said level control means.

10. A device as defined in claim 1, wherein said dimmer means comprises:

a potentiometer having a voltage across it, said potentiometer having a center tap which is added to said attenuated first output signal.

11. A device as defined in claim 1, wherein said driving means comprises:

a solid state relay for continuously varying the voltage level supplied to drive the lamp proportionately to variations in said second output signal.

12. A device as defined in claim 1, wherein said driving means comprises:

a comparator having as an input said second output signal;

a cosine ramp generator supplying a cosine ramp waveform as a second input to said comparator, said comparator subtracting said second output signal from said cosine ramp waveform to produce a third output signal, said third output signal being supplied as an input to said solid state relay; and a solid state relay for continuously varying the voltage level supplied to drive the lamp proportionately to variations in said third output signal.

13. A device as defined in claim 1, additionally comprising:

bandpass filter means for filtering said attenuated first output signal.

14. A device for generating a flickering signal to power a lamp in a flickering manner, comprising:

means for receiving an input from a video camera, said video camera being focused on a fire or like phenomena to produce a video raster;

means for placing a first cursor at a desired location within said video raster;

means for providing a first output signal proportional to the Average Picture Level within said first cursor;

first level control means for attenuating said fist output signal;

second dimmer means for adding a variable degree of offset to said attenuated first output signal to produce a second output signal; and first driving means for driving a lamp with a voltage proportional to said second output signal.

15. A device as defined in claim 14, additionally comprising:

means for placing a second cursor at a desired location within said video raster;

means for providing a third output signal proportional to the Average Picture Level within said second cursor;

second level control means for attenuating said third output signal;

second dimmer means for adding a variable degree of offset to said attenuated third output signal to produce a fourth output signal; and second driving means for driving a second lamp with a voltage proportional to said fourth output signal.

16. A device for generating a flickering signal to power a lamp in a flickering manner, comprising:

a variable rate oscillator having as an output a clock signal;

means for varying the rate at which said variable rate oscillator oscillates;

a shift register for generating a plurality of binary digital output bits, said shift register having a plurality of stages, with said plurality of binary digital output bits being outputs of stages of said shift register, said shift register operating at the frequency of said clock signal;

a digital-to-analog converter for converting said plurality of binary digital output bits to an analog first output signal which varies between a plurality of levels;

level control means for attenuating said first output signal to produce a second output signal;

bandpass filter means for filtering said second output signal;

dimmer means for adding a variable degree of offset to said second output signal to produce a third output signal;

a cosine ramp generator for supplying a cosine ramp waveform;

a comparator having as inputs said third output signal and said cosine ramp waveform, said comparator subtracting said third output signal from said cosine ramp waveform to produce a fourth output signal; and relay means for continuously driving a lamp with a variable voltage proportional to said fourth output signal.

17. A method of generating a flickering signal to power a lamp in a flickering manner, comprising:

generating a first output signal which varies between a plurality of levels;

attenuating said first output signal by a selected proportion;

adding a variable amount of offset to said attenuated first output signal to produce a second output signal;

subtracting said second output signal from a cosine ramp waveform to produce a third output signal;

continuously driving a lamp with a variable voltage proportional to said third output signal; and varying the rate at which said variable voltage level varies.

18. A method of generating a flickering signal to power a lamp in a flickering manner, comprising:

generating a first output signal which varies between a plurality of levels;

attenuating said first output signal by a selected proportion;

adding a variable amount of offset to said attenuated first output signal to produce a second output signal;

continuously driving a lamp with a variable voltage proportional to said second output signal; and varying the rate at which said variable voltage level varies levels.

* * * * *

UNITED STATES PATENT AND TRADEMARK OFFICE
CERTIFICATE OF CORRECTION

PATENT NO. : 5,032,766

DATED : Jul. 16, 1991

INVENTOR(S) : Kurt Lundgren et al

It is certified that error appears in the above-identified patent and that said Letters Patent is hereby corrected as shown below:

ON THE TITLE PAGE: Item [76] should read

CURT LUNDGREN, 3908A Prospect Ave., Culver City, Calif. 90232;
GLENN GUNDLACH, 1254 Vista Ct., Apt. 9, Glendale, Calif. 91205;
WILLIAM IRWIN, 1636 N. Verdugo, Glendale, Calif. 91205

Signed and Sealed this

Fifteenth Day of December, 1992

Attest:

DOUGLAS B. COMER

*Attesting Officer*     *Acting Commissioner of Patents and Trademarks*